bination with a revoluble platen, of a wide chute at the introductory side of the platen having side members engageable with the edges of a wide work-sheet for guiding the latter to the platen, a narrow chute at the introductory side of the platen between the side members of the wide chute, and having side members engageable with the edges of a narrow work-sheet for guiding the narrow work-sheet to the platen to overlie the wide work-sheet thereon, said wide work-sheet passing above the narrow chute at the introductory side of the platen, releasable means co-operative with the platen to advance the wide and narrow work-sheets together for line-feeding, and means at the delivery side of the platen to engage the side margins of the wide work-sheet to hold it stationary while the narrow work-sheet is adjusted thereover when said releasable means are released; the wide chute comprising two parts or members mounted for adjustment to different distances from each other to guide sheets of different widths, and also for adjustment to different distances from the side members of the narrow chute for varying the positions relatively to each other of the wide and narrow work-sheets.

JESSE A. B. SMITH.

Witnesses:
FRANK R. ZWAHLEN,
MARGARET G. NOONAN.

March 18, 1924.
W. B. SMITH
1,487,672
POST PARCEL, BAG, SACK, AND ANALOGOUS SEALING DEVICE
Filed April 30, 1923
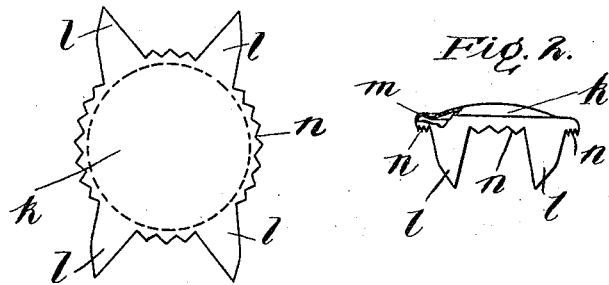
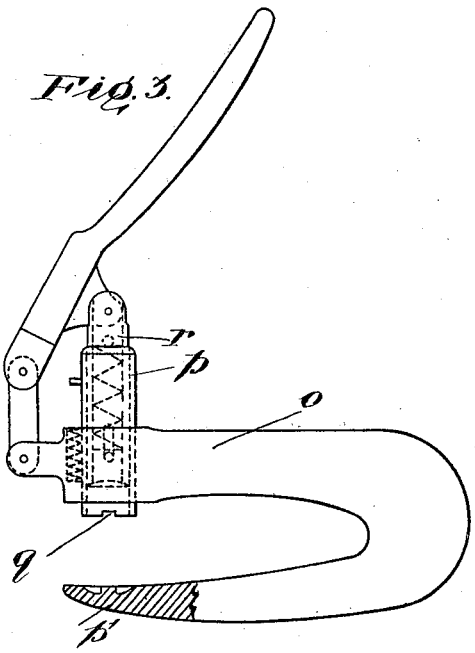
Inventor
William B. Smith
by Ernest Wilkinson
Attorney